United States Patent [19]

Ciaccio

[11] 3,742,548

[45] July 3, 1973

[54] SAFETY OVERLOAD CLUTCH FOR SEWER-RODDING MACHINES AND THE LIKE, WITH LOADING INDICATOR

[75] Inventor: Peter L. Ciaccio, Los Angeles, Calif.

[73] Assignee: Flexible, Inc., Pittsburgh, Pa.

[22] Filed: Mar. 27, 1972

[21] Appl. No.: 238,151

[52] U.S. Cl. ............................ 15/104.3 SN, 192/150
[51] Int. Cl. ............................................... B08b 9/02
[58] Field of Search ................. 15/104.3, 104.3 SN; 192/150

[56] References Cited
UNITED STATES PATENTS
3,574,878   4/1971   Shames ...................... 15/104.3 SN

*Primary Examiner*—Edward L. Roberts
*Attorney*—Lynn H. Latta

[57] ABSTRACT

A spring-loaded clicking jaw clutch for overload release, is provided with a load adjustment including an adjustment screw transmitting its loading through a hydraulic column which also transmits the load to a pressure gage on which the load intensity is visibly indicated.

7 Claims, 4 Drawing Figures

PATENTED JUL 3 1973

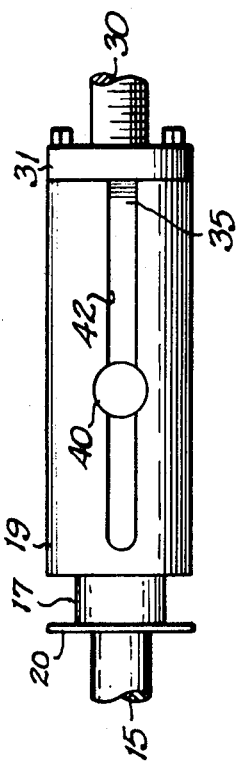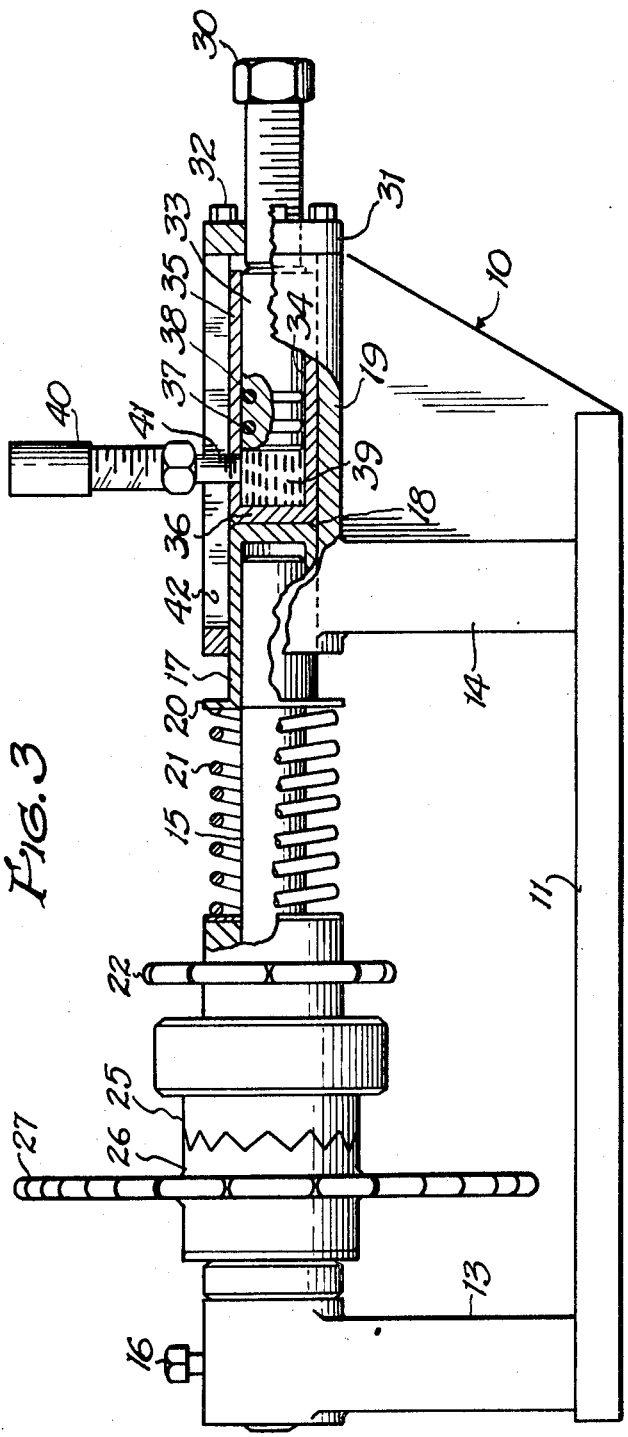

SAFETY OVERLOAD CLUTCH FOR SEWER-RODDING MACHINES AND THE LIKE, WITH LOADING INDICATOR

In the sewer-cleaning machine art, in which extensive lengths of flexible cleaning tool driving rod are simultaneously rotated and fed longitudinally into a sewer pipe, power machines such as the one disclosed in Ciaccio U.S. Pat. No. 3,120,017, utilize endless chains with driving dogs to engage the rod couplings for positive projection of the rod into the sewer pipe while it is being rotated by a reel from which a supply of the rod is drawn from storage. To avoid damage to the rod by continued positive feeding when the tool at its forward end meets an obstruction, such machines are provided with a clicking overload jaw clutch for transmitting the drive from the power source to the feed chains. When its spring loading is properly adjusted, such a clicking jaw clutch is effective both to release the feed when excessive resistance to the forward feed of the rod is imposed by an obstruction in the pipe, and damage to the rod which could occur by forcibly feeding it against such resistance, is thereby avoided. However, the optimum loading on the clutch will vary with varying cleaning job requirements, and existing overload clutches are not provided with means to indicate the actual loading of the clutch, making it necessary for the operator to rely on his own "feel" of the machine's operation, which involves considerably guesswork.

RESUME OF THE INVENTION

Considering the existing condition of the art as outlined above, it will be apparent that there is a need for more accurate determination of the loading of an overload clutch as well as a means for adjusting the loading to varying intensities which are immediately indicated on the clutch mechanism. To attain this is the general object of the present invention.

More specifically, the invention aims to provide an overload clicking jaw type clutch, spring-loaded to various selected load intensities by a simple screw adjustment, and accurately indicated in terms of loading pressure by a hydraulic pressure gage directly responsive to pressure in a hydraulic liquid column which directly transmits loading pressure from the adjustment screw to the spring which loads the clutch jaws.

Further objects are to provide a power-transmitting sprocket cluster driven through such an overload clutch; to embody therein a loading pressure indicating gage; and to attain such a combination in a relatively simple assembly which adds very little to the cost of the overload clutch unit other than the cost of a hydraulic pressure gage.

These and other objects will become apparent in the ensuing specification and appended drawings, wherein:

DESCRIPTION-GENERAL

FIG. 3 is a top plan view of the clutch unit, partially in section; and

FIG. 4 is a fragmentary elevational view.

Figure 2:
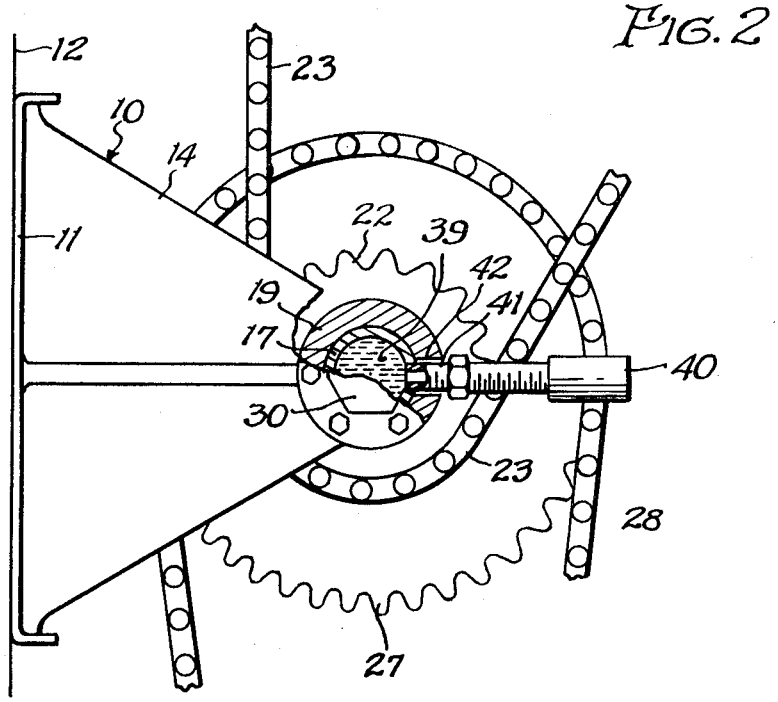
FIG. 2 is a detail end view of the overload clutch unit, viewed the same as in FIG. 1, with parts broken away and shown in section.
Figure 1:
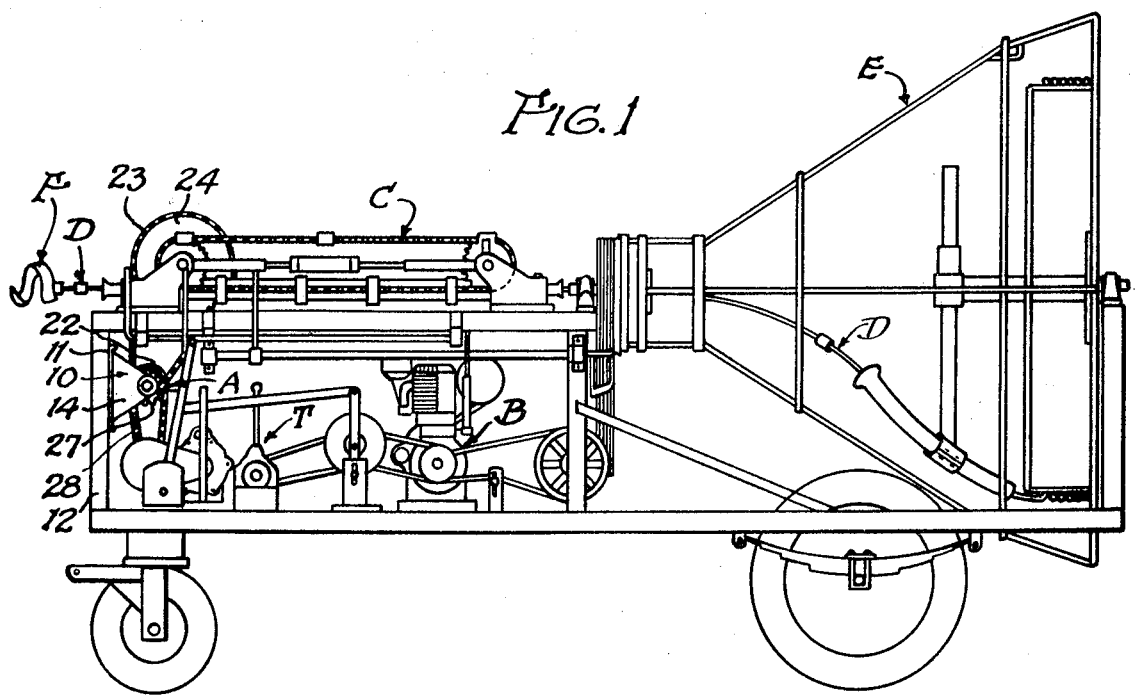
FIG. 1 is a side view of a sewer rodding machine embodying my improved overload clutch.

Referring now to the drawing in detail, I have shown therein, as an example of one form in which the invention may be embodied, an overload clutch A arranged to transmit rod-feeding drive from a power unit B to a pair of feed chains C of a power sewer-cleaning machine in which jointed tool-driving flexible rod D is fed from a reel E between the chains C. Couplings spaced along the rod are engaged by drive lugs carried by chains C to impart positive feeding movement to the rod D. Since the feed is positive, it is essential that it be interrupted when the cleaning tool F at the forward end of the rod meets an obstruction offering greater resistance than the maximum pressure that can safely be applied to the rod without causing it to buckle and become bent. The overload clutch functions to transmit the drive up to the maximum permissible loading, and to release the drive whenever the loading tends to exceed such maximum.

DESCRIPTION-DETAILED

Clutch A comprises a bracket 10 including a base 11 for attachment to a forward upright 12 of the machine's frame and having, near its respective ends, laterally projecting bracket arms 13, 14. A sprocket-supporting shaft 15 has one end secured (e.g. by a set screw 16) in the end of bracket arm 13, and its other end telescoped into a pressure-transmitting retainer cup 17 which is axially slidable in a bore 18 in a bearing sleeve 19 embodied in the end of bracket arm 14. Cup 17 has an outer end provided with a head (flange) 20 for applying loading pressure to one end of a clutch-loading coil spring 21 through which the shaft 15 extends. The other end of spring 21 abuts the hub of a sprocket 22 which transmits drive, through a sprocket chain 23 and a sprocket 24, to the feed chains C. Sprocket 22 is rotatably mounted on shaft 15 and is connected to a clicking clutch jaw 25 to receive drive from a coacting clutch jaw 26. Jaw 26 is an integral part of a sprocket 27 which likewise is rotatably mounted on shaft 15. Sprocket 27 is driven by a chain 28 which receives drive from a transmission unit T driven by power unit B. Jaws 25, 26 embody triangular clutch teeth normally interlocked in driving engagement under a spring load provided by coil spring 21. The spring load is regulated by an adjustment screw 30 threaded through a nut 31 of disc form detachably secured to the remote end of bearing sleeve 19 by means of cap screws 32. The end of screw 30 abuts a piston 33 which is axially slidable in the bore 34 of a cup-shaped plunger 35 having a closed forward end 36 which abuts the rear end of retainer cup 17. Cup 17 retains the rear end of shaft 15 in coaxial assembly with plunger 35. Piston 33 is sealed to bore 34 by one or more O-rings 37 seated in annular grooves 38 in its periphery. Pressure is transmitted from piston 33 to plunger 35 by a body of hydraulic fluid 39 trapped in bore 34 between the forward end of the piston 33 and the closed forward end 36 of plunger 35.

Plunger 35 carries a pressure gage 40 which is connected hydraulically to fluid body 39 by a fitting 41 (e.g. neck) extending through a slot 42 in the side of bearing 19, parallel to its axis. Slot 42 allows fitting 41 to freely slide axially in bearing 19 in response to axial movement imparted to plunger 35 by adjustment screw 30. Preferably, the rear end of slot 42 is open in order to facilitate assembly and repair of the pressure-transmitting plunger assembly.

Pressure load developed in spring 21 by adjustment screw 30, being transmitted through hydraulic fluid body 39, is also transmitted to pressure gage 40, which thus indicates accurately the intensity of the spring load on the clutch jaws.

I claim:

1. In a power-operated machine, in combination: means for feeding a tool against a resistance; and means including an overload release clutch for transmitting feed from a power unit to said feeding means, said clutch comprising:

a supporting shaft;

a pair of drive-transmitting elements rotatably mounted on said shaft, one of said elements receiving drive from said power unit and the other of said elements transmitting the drive to said feeding means;

mating clutch jaws interposed between said drive-transmitting elements for transmitting the drive from said one element to said other element;

a coil spring having one end abutting said one drive-transmitting element for loading the clutch to transmit drive when said resistance does not exceed a predetermined limit;

axially slidable pressure-transmitting means abutting the other end of said spring for applying load thereto;

adjustment means for varying said load;

a hydraulic pressure gage for indicating said load;

and means including a body of hydraulic fluid trapped in said pressure-transmitting means and communicating with said pressure gage, for applying said load simultaneously to said pressure-transmitting means and to said pressure gage, whereby said load will be constantly indicated on said gage.

2. The combination defined in claim 1:

said pressure-transmitting means including a plunger of cup form having a closed forward end transmitting pressure to said spring;

a piston slidably in said plunger and sealed therein, said fluid body being trapped between the forward end of said piston and said closed forward end of the plunger;

said adjustment means acting against the rear end of said piston.

3. The combination defined in claim 2:

said clutch including a bearing sleeve in which said plunger is slidably mounted;

and a nut on the rear end of said sleeve;

said adjustment means comprising a screw threaded through said nut and engaging said piston.

4. The combination defined in claim 2:

said clutch including a bearing sleeve in which said plunger is slidably mounted, said sleeve having a longitudinal slot in one side thereof;

said pressure gage having a hydraulic fitting secured in the side of said plunger and slidable in said slot.

5. The combination defined in claim 2:

said pressure-transmitting means including a pressure-transmitting retainer cup slidably telescoped over the rear end of said shaft, the forward end of said plunger abutting the rear end of said cup.

6. The combination defined in claim 2:

said pressure-transmitting means including a pressure-transmitting element telescopically coupled to the rear end of said shaft, the forward end of said plunger abutting the rear end of said element;

said clutch further including a bearing sleeve in which said plunger is slidably mounted;

said pressure-transmitting element being slidably mounted in said sleeve.

7. The combination defined in claim 1:

said machine being a sewer-cleaning machine including a flexible tool-driving rod which is fed from the machine into a sewer pipe by said feeding means, and which drives a tool at its forward end under pressure provided by said load.

* * * * *